United States Patent Office 3,705,889
Patented Dec. 12, 1972

3,705,889
LINCOMYCIN ANALOGS AND PROCESS
Brian Bannister, Kalamazoo, and Barney J. Magerlein, Portage, Mich., assignors to The Upjohn Company, Kalamazoo, Mich.
No Drawing. Filed Apr. 28, 1970, Ser. No. 32,752
Int. Cl. C07c 47/18
U.S. Cl. 260—210 R        8 Claims

ABSTRACT OF THE DISCLOSURE

The antibiotic 7-O-(lower-alkyl)-8-norlincomycin and its S-analogs are prepared by alkylating 8-norlincomycin and its S-analogs or by acylating lower-alkyl 7-O-(lower-alkyl)-8-nor-α-thiolincosaminide. Novel intermediates include lower-alkyl N - acetyl - 8 - nor - α - thiolincosaminide; 6 - deamino - 6 - nitro - 8 - nor-α-thiolincosaminide, its peracylate and its 7-O-(lower-alkyl) derivatives; and lower-alkyl 6 - deoxy - 6-methylene - 6-nitro-1-thio-α-D-galactopyranoside peracylate.

BRIEF SUMMARY OF THE INVENTION

This invention is concerned with novel compounds related to lincomycin and to a process for the preparation thereof and is particularly directed to compounds of the formula

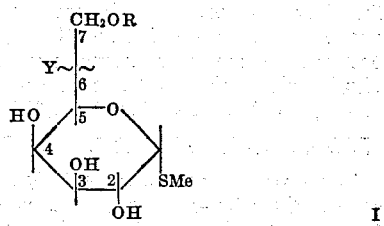

where Me and R are lower-alkyl, for example, methyl, ethyl, propyl, butyl, pentyl, hexyl, heptyl, and octyl and the isomeric forms thereof and Y is $NO_2$, $NH_2$, NHAc where Ac is lower-alkanoyl or lower aralkanoyl, for example alkanoyl or phenylalkanoyl of not more than 8 carbon atoms, or NHPc where Pc is the acyl radical of an L-2-pyrrolidinecarboxylic acid, for example, L-2-pyrrolidinecarboxacyl, 1-methyl or 1-ethyl-L-2-pyrrolidinecarboxacyl, 4 - (lower-alkyl) - L - 2 - pyrrolidinecarboxacyl, and 1-methyl or 1-ethyl-4-(lower-alkyl)-L-2-pyrrolidinecarboxacyl in which lower-alkyl is exemplified by the above lower-alkyl radicals but advantageously is from 3 to 8 carbon atoms.

The novel compounds of Formula I are prepared by the following sequence:

Sequence 1

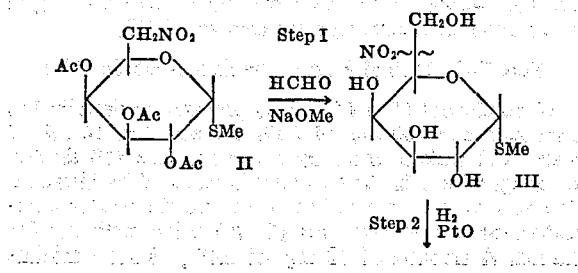

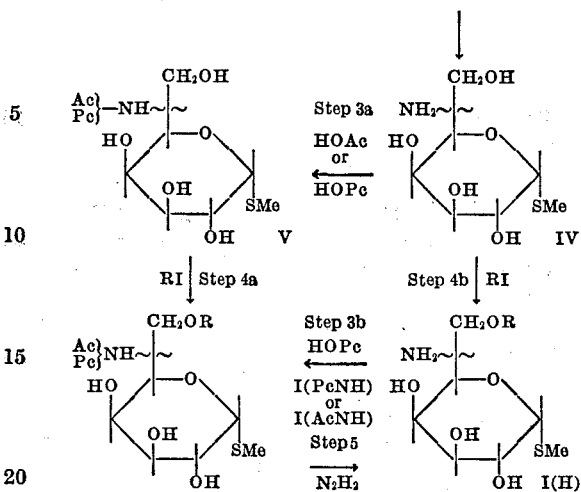

The starting Compound II in which Ac is acetyl or benzoyl or like protective carboxacyl group is a known compound.

The several steps generally are carried out by procedures already known in the art. Step 1 is an aldol-type condensation in which the α-hydrogen is activated by a nitro group instead of a carbonyl, as in carbohydrate C-nitro alcohol synthesis. Step 2 is a standard low pressure hydrogenation over platinum oxide. Water or aqueous alcohol is a suitable solvent and pressures from 1 to 5 atmospheres can be used. Alternatively the nitro group can be reduced by means of a lithium aluminum hydride reduction. Step 3 is a known acylation (U.S. Pat. 3,380,-992). Steps 4a or 4b, however, are atypical in that they are alkylations in which the 7-O-hydrogen is selectively replaced.

If desired, Compound IV can be N-acylated with a hydrocarbon carboxacyl (Step 3a where Ac is hydrocarboxacyl), for example, acetyl or like lower alkanoyl or benzoyl and the like; then alkylated (Step 4a where Ac is hydrocarbon carboxacyl); and then deacylated (Step 5), to give Compound I(H). This sequence has the avantage that it eliminates any possibility of quaternization in the alkylation step where Ac is a 1-substituted pyrrolidinecarboxylic acid acyl. The deacylation is effected by hydrazinolysis as disclosed in U.S. Pat. 3,360,992.

The novel compounds of the invention also can be made by the following sequence:

Sequence 2

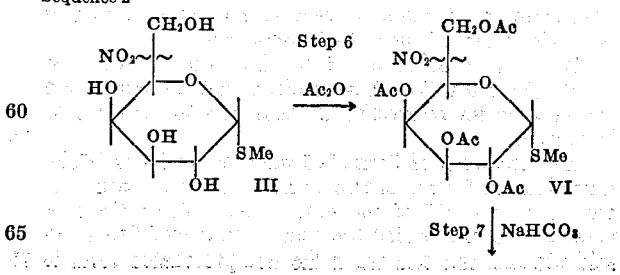

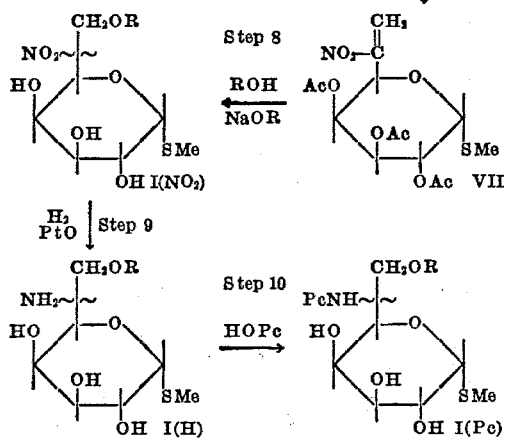

Step 6 is a simple acylation such as is commonly used in peracylating sugars. Step 7 is effected by treating Compound VI with a mild base, for example, sodium bicarbonate, sodium carbonate, or triethylamine, in an inert non-oxy solvent and is an example of the Schmidt-Rutz nitroolefin synthesis from acylated α-nitro alcohols. Oxy solvents, such as water and alcohols, are undesirable if the nitroolefin VII is desired as they tend to add at the double bond so that the yields are reduced or the desired compound is not obtained. Suitable solvents are benzene, dioxane, dimethylsulfoxide, dimethylformamide and the like. At least the stoichiometric amount of base is required. A substantial excess is desirable especially, as with sodium bicarbonate, where the base has limited solubility in the solvent system. The reaction takes place at room temperature although gentle heating say up to about 100° C., preferably about 80° C., is desirable.

Step 8 is effected by reacting Compound VII with an alcohol, ROH, in the presence of a catalytic amount of a base, such as the sodium or barium alkoxide of the alcohol, ROH or a different alcohol. An excess of the alcohol is ordinarily used to form a menstruum for the reaction. The reaction also takes place at room temperature and here, too, gentle heating up to say about 500° C. can be used. In figuring the stoichiometric amount of alcohol required it should be borne in mind that one mole is required to saturate the double bond and 3 moles are required for alcoholysis of the 2-, 3-, and 4-O-acyl groups per mole of starting compound.

Step 9 is a standard low-pressure hydrogenation like Step 2 of sequence 1.

Steps 7 and 8 can be effected simultaneously by treating Compound VI with an alcohol, ROH, and the sodium or barium alkoxide, or like alkoxide, of the alcohol, ROH, (Steps 7–8). This step differs from Step 8 in that the amount of alkoxide required is one mole equivalent plus a catalytic amount. Thus by omitting Step 7 and modifying Step 8 as above, compound $I(NO_2)$ is obtained directly from Compound VI with Compound VII being formed only as a transient intermediate.

The novel compounds of the invention (Formula I) can be used to modify polyurethane resins. Either as such or after condensation with ethylene or propylene oxide they can be added to the reaction mixture of polyol and polyisocyanate and function therein as a cross-linking agent or as all or part of the polyol component.

The novel compounds of the invention where Y is NHPc (Formula IPc) have antibacterial properties and can be used for controlling bacteria in a like manner to lincomycin.

The compounds of Formula I where Y is $NH_2$ or NHPc exist either in the protonated or non-protonated forms according to the pH of the environment. When the protonated form is intended the compound is qualified as an acid-addition salt and when the non-protonated form is intended it is qualified as the free base. The free bases can be converted to stable acid-addition salts by neutralizing the free base with the appropriate acid, about pH 7.0, and advantageously to about pH 2 to pH 6. Suitable acids for this purpose include hydrochloric, sulfuric, phosphoric, thiocyanic, fluosilicic, hexafluoroarsenic, hexafluorophosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicylic, 5-phenylsalicylic, 3-methylglutaric, orthosulfobenzoic, cyclohexanesulfamic, cyclopentanepropionic, 1,2-cyclohexanedicarboxylic, 4-cyclohexanecarboxylic, octadecenylsuccinic, octenylsuccinic, methanesulfonic, helianthic, Reinecke's, dimethyldithiocarbamic, hexadecylsulfamic, octadecylsulfamic, sorbic, monochloroacetic, undecylenic, 4'-hydroxyazobenzene-4-sulfonic, octadecylsulfuric, picric, benzoic, cinnamic, and like acids.

The acid-addition salts can be used for the same purposes as the free base or they can be employed to upgrade the same. For example, the free base can be converted to a water-insoluble salt, such as the picrate, which can be subjected to purification procedures, for example, solvent extractions and washings, chromatography, fractional liquid-liquid extractions, and crystallization, and then used to regenerate the free base form by treatment with alkali or to make a different salt by metathesis. Or the free base can be converted to a water-soluble salt, such as the hydrochloride or sulfate, and the aqueous solution of the salt extracted with various water-immiscible solvents before regenerating the free base form by treatment of the thus-extracted acid solution, or converted to another salt by metathesis. The free bases can be used as buffers or as antacids. The thiocyanic acid addition salt when condensed with formaldehyde forms resinous materials useful as pickling inhibitors according to U.S. Pats. Nos. 2,425,320 and 2,606,155. The free bases also make good vehicles for toxic acids. For example, the fluosilicic acid addition salts are useful as mothproofing agents according to U.S. Pats. Nos. 1,915,334 and 2,075,359 and the hexafluoroarsenic acid and hexafluorophosphoric acid addition salts are useful as parasiticides according to U.S. Pats. Nos. 3,122,536 and 3,122,552.

DETAILED DESCRIPTION OF THE INVENTION

The invention can be more fully understood by reference to the following examples in which the solvent systems are by volume and the other parts and proportions are by weight unless otherwise specified.

EXAMPLE 1

Part A-1: Methyl 6-deamino-6-nitro-8-normethyl-α-thiolincosaminide (III)

Sodium methoxide (25% solution in methanol) is added to a solution of 3.3 g. of methyl 6-deoxy-6-nitro-1-thio-α-D-galactopyranoside 2,3,4-tri-O-acetate (II) in 50 ml. of methanol until the solution is strongly basic. After standing at ambient temperature for 30 min., 3 ml. of Formalin is added. Within 30 min. the pH of the solution is adjusted to 7 by the addition of Dowex 50 ($H^+$) resin (a cross-linked ar-polystyrylsulfonic acid type cation exchange resin). The resin is removed by filtration. Chromatography over 200 g. of silica gel using chloroform-methanol (4:1) for elution gives non-crystalline fraction whose tlc on the same system shows one spot more polar than starting nitro compound (II).

Part B-1: Methyl 8-nor-α-thiolincosaminide (IV)

Nitro alcohol (III) (400 mg.) prepared as described in Part A-1 and 400 mg. of $PtO_2$ are added to 10 ml. of water and shaken under hydrogen pressure (30 lbs./sq. in. gauge) for 1 hr. The catalyst is removed by filtration. The solvent is evaporated in vacuo and the residue chromatographed over silica gel (25 g.) using methanol for elution. A fraction of 72 mg. of methyl 8-nor-α-thiolincosaminide (IV) is obtained. This material is more polar than the starting nitro alcohol (III) and gives a pink color test with ninhydrin reagent characteristic of aminoalcohols of this type.

Part C-1: 8-norlincomycin hydrochloride (V)

To a solution of 103 mg. of 4-propylhygric acid hydrochloride and 101 mg. of triethylamine in 9 ml. of acetonitrile is added 68 mg. of i-butyl chloroformate. After stirring at 0° C. for 5 min. a solution of 72 mg. of methyl 8-nor-α-thiolincosaminide (IV) in 4 ml. of water is added. The solution is stirred for 2 hrs. The solvent is evaporated in vacuo. The residue is extracted with methylene chloride, dried and again the solvent removed. The residue is chromatographed over 10 g. of silica gel eluting with chloroform-methanol (4:1). The product fraction of 10 mg. is dissolved in acetone and acidified with hydrochloric acid. Evaporation of the solvent of the clarification affords 8.9 mg. of 8-norlincomycin hydrochloride (V).

Part D-1: 7-O-methyl-8-norlincomycin (I, Pc)

To a solution of 39 mg. of 8-norlincomycin hydrochloride (V) in 1 ml. of dimethylformamide is added 46 mg. of silver oxide and 16 mg. of methyl iodide in two portions, 2 hrs. apart. The final mixture is stirred at room temperature for 6 hrs., filtered and the solvent distilled in vacuo. Chromatography over silica gel using chloroform-methanol (6:1) for elution gives 7-O-methyl-8-norlincomycin (I, Pc) as a fraction, less polar than 8-nor-lincomycin hydrochloride (V, Pc).

EXAMPLE 2

Part A-2: Methyl 2,3,4,7-tetra-O-acetyl-6-deamino-6-nitro-8-nor-α-thiolincosaminide (VI)

A solution of 0.5 g. of methyl 6-deamino-6-nitro-8-normethyl-α-thiolincosaminide (III) in 4 ml. of acetic anhydride containing 1 drop of concentrated $H_2SO_4$ is held at room temperature for 1 hr. The reaction mixture is poured onto ice and extracted with methylene chloride to give methyl 6-deamino-6-nitro-8-nor-α-thiolincosaminide, 2,3,4,7-tetraacetate (VI) as an oily residue after evaporation of the solvent.

Part B-2: Methyl 2,3,4,7-tetra-O-acetyl-6-deoxy-6-methylene 6-nitro-1-thio-α-D-galactopyranoside (VII)

Methyl 2,3,4,7 - tetra-O-acetyl-6-deamino-6-nitro-8-nor-α-thiolincosaminide (400 mg.), from part A-2 is dissolved in 15 ml. of benzene and 1 g. of sodium bicarbonate added. The solution is heated under reflux for 2 hrs., filtered and concentrated to give, after the usual purification, methyl 2,3,4 - tri-O-acetyl-6-deoxy-6-methylene 6-nitro-1-thio-α-D-galactopyranoside (VII) as an oily residue.

Part C-2: Methyl 6-deamino-7-O-methyl-6-nitro-8-nor-α-thiolincosaminide (I, $NO_2$)

Two hundred mg. of methyl 6-deoxy-6-methylene-6-nitro-1-thio-α-D-galactopyranoside (VII) is dissolved in 5 ml. of methanol and 1 drop of 10% NaOMe in MeOH added. After 30 min. Dowex 50 (H+) is added until the solution is neutral. Filtration and evaporation of the solvent affords methyl 6-deamino-7-O-methyl-6-nitro-8-nor-α-thiolincosaminide (I, $NO_2$).

Part D-2: Methyl 7-O-methyl-8-nor-thiolincosaminide (I, H)

Reduction of 100 mg. of methyl-6-deamino-7-O-methyl-6-nitro-8-nor-α-thiolincosaminide (I, $NO_2$) in water over 100 mg. $PtO_2$ as described above (Part B-1) gives methyl 7-O-methyl-8-nor-α-thiolincosaminide (I, H) after filtration of the solution and lyophilization.

This material is condensed with PHA in the manner described above to give 7-O-methyl-8-norlincomycin (I, Pc).

Part E-2: 7-O-methyl-8-normethyllincomycin (IAc)

Acylation of methyl 7-O-methyl-8-normethyl-α-thiolincosaminide by the procedure of part C-1 yields 7-O-methyl-8-nor-methyllincomycin (I, Pc).

EXAMPLE 3

Part A-3: Methyl N-acetyl-8-nor-α-thiolincosaminide (V, Ac)

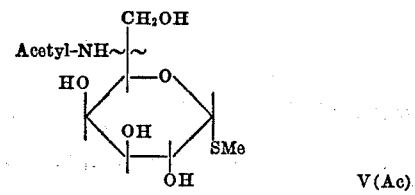

V(Ac)

Ninety-six mg. methyl 8-nor-α-thiolincosaminide (IV) (about 0.4 millimole) is suspended with stirring in 1 cc. of methanol and treated with 8 mg. acetic anhydride (about 0.8 millimole). After standing at room temperature (25° C.) overnight the solid is filtered, washed with methanol, dried, and recrystallized from absolute methanol to yield methyl N-acetyl-8-nor-α-thiolincosaminide.

Part B-3: Methyl N-acetyl-7-O-methyl-8-nor-α-thiolincosaminide (I, AcNH)

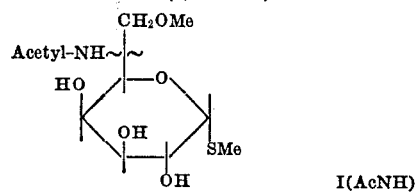

I(AcNH)

To a solution of 30 mg. (about 0.1 millimole) of methyl N-acetyl-8-nor-α-thiolincosaminide (V) in 1 ml. of dimethylformamide (DMF) is added 46 mg. of silver oxide and 16 mg. (about 0.11 millimole) methyl iodide in two portions 2 hrs. apart. After stirring for 6 hrs., the reaction mixture is filtered and the solvent removed under vacuum. The resulting solid is chromatographed over silica gel using chloroform-methanol (6:1) for elution giving methyl N-acetyl-7-O-methyl-8-nor - α - thiolincosaminide (I, AcNH).

Part C-3: Methyl 7-O-methyl-8-nor-α-thiolincosaminide (IH)

A solution of 25 mg. of methyl N-acetyl-7-O-methyl-8-nor-α-thiolincosaminide I(AC) in 2 ml. hydrazine hydrate (98–100%) is refluxed for 24 hrs. Excess hydrazine hydrate is removed by heating under vacuum on a steam bath. The residue is washed well with acetonitrile and then ether to yield methyl 7-O-methyl-8-nor-α-thiolincosaminide I(H) which is recrystallized by adding an equal volume of ethylene glycol dimethyl ether to a solution in hot dimethylformamide.

We claim:
1. A compound of the formula

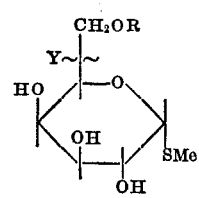

where R and Me are the same or different lower-alkyl and Y is $NO_2$, $NH_2$, NHAc where Ac is lower alkanoyl or lower aralkanoyl, or NHPc where Pc is the acyl radical of an L-2-pyrrolidinecarboxylic acid; and the acid addition salts where Y is $NH_2$ or NHPc.

2. The compound of claim 1 where Y is $NO_2$.
3. The compound of claim 1 where Y is $NH_2$.
4. The compound of claim 1 where Y is NHAc.
5. The compound of claim 1 where Y is NHPc.

6. The compound of claim 1 where R and Me are methyl and Y is 1-methyl-4-propyl-L-2-pyrrolidinecarboxacylamido.

7. A compound of the formula

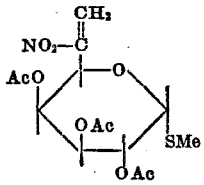

where Me is lower-alkyl and Ac is lower alkanoyl or lower aralkanoyl.

8. A process for making compounds of the formula

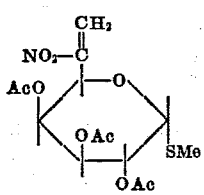

where Me is lower-alkyl and Ac is lower-alkanoyl or lower-aralkanoyl which comprises heating a compound of the formula

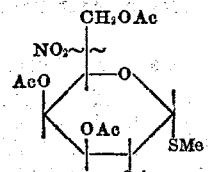

where Me and Ac are as given above with a mild alkali in a nonoxy solvent.

References Cited
UNITED STATES PATENTS

| | | | |
|---|---|---|---|
| 3,300,475 | 1/1967 | Bannister | 260—210 R |
| 3,380,992 | 4/1968 | Argoudelis et al. | 260—210 R |
| 3,514,440 | 5/1970 | Hoeksema | 260—210 R |

LEWIS GOTTS, Primary Examiner

J. R. BROWN, Assistant Examiner

U.S. Cl. X.R.

260—999